United States Patent [19]

Benni

[11] Patent Number: 5,800,206

[45] Date of Patent: Sep. 1, 1998

[54] ELECTRIC CONTROL AND SIGNALING DEVICE FITTED WITH A DETACHABLE BLOCK

[75] Inventor: Dominique Benni, Mornac, France

[73] Assignee: Schneider Electric SA, Boulogne-Billancourt, France

[21] Appl. No.: 665,981

[22] Filed: Jun. 19, 1996

[30] Foreign Application Priority Data

Jun. 20, 1995 [FR] France .................................. 95 07464

[51] Int. Cl.$^6$ .................................................. H01R 13/60
[52] U.S. Cl. .......................................................... 439/532
[58] Field of Search ..................................... 439/532, 716

[56] References Cited

U.S. PATENT DOCUMENTS 5,230,422   7/1993   Karweik et al. .

FOREIGN PATENT DOCUMENTS 31 49 310   6/1983   Germany .

Primary Examiner—Neil Abrams
Assistant Examiner—Christopher Goins
Attorney, Agent, or Firm—Oblon, Spivak, McClelland, Maier & Neustadt, P.C.

[57] ABSTRACT

An electric control or signaling device such as a push-button device which includes a body to be inserted in an orifice of wall and includes an electric block, in particular a contact block, and a carrier base connected to the body and fitted with detachable fixing members for the electric block. This device serves to improve installation and maintaining of a snap-in electric block under the base of a control or signaling device of the type described. The electric block includes, on a fixing face thereof situated towards the carrier base, two rigid heels. The electric blocks are advantageously stackable and, for this purpose, present on their connecting face, which is situated opposite the base, a ratchet lug and a recess which are similar to the stop recess of the base for receiving the corresponding heels of a stacked block.

5 Claims, 1 Drawing Sheet

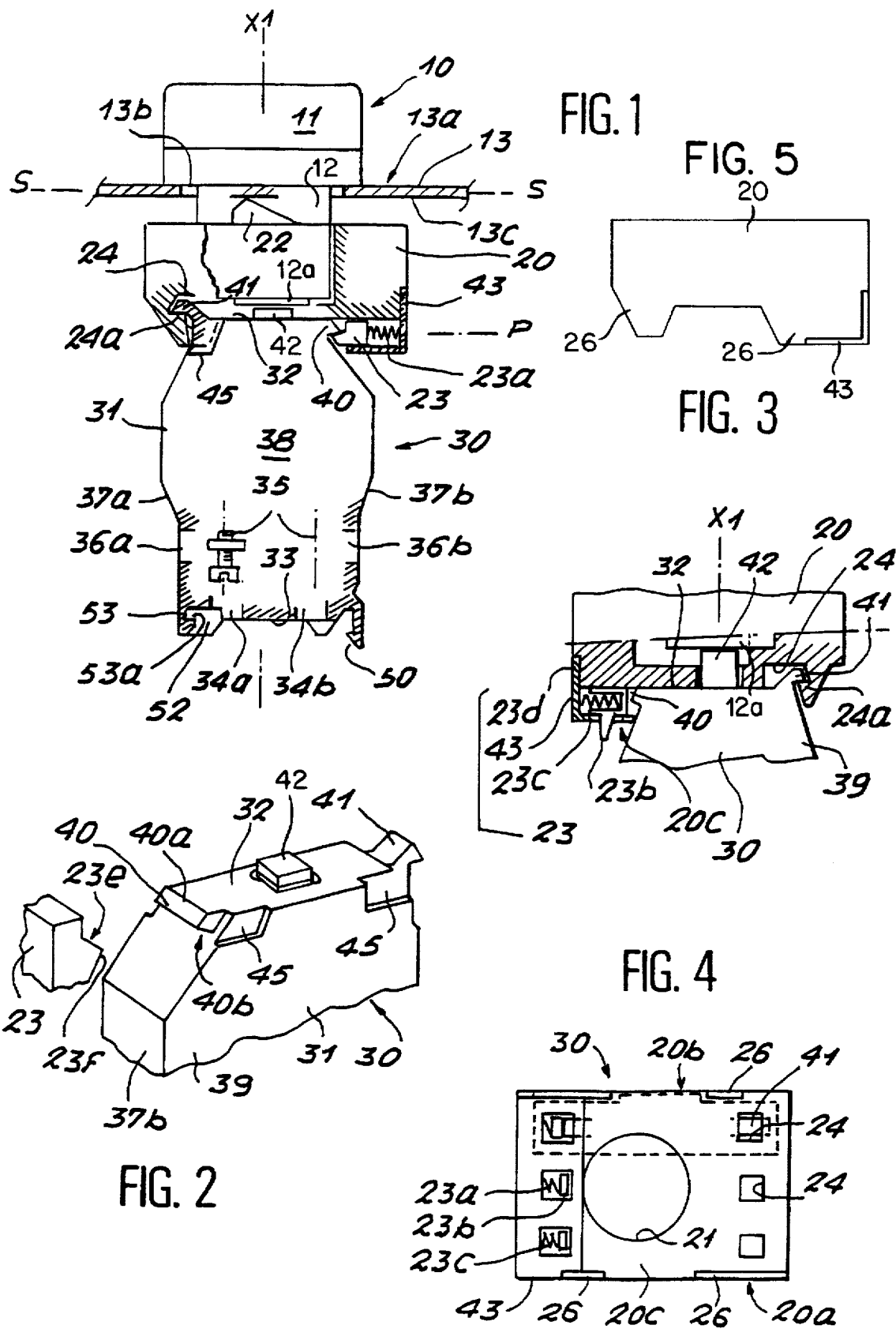

ELECTRIC CONTROL AND SIGNALING DEVICE FITTED WITH A DETACHABLE BLOCK

BACKGROUND OF THE INVENTION

1. Field of the Invention

This invention concerns an electric control or signaling device such as a push-button comprising a body to be inserted in an orifice of a wall and an electric block, notably a contact block, and a carrier base added to the body on the reverse of the wall and fitted with detachable fixing means for the electric block.

2. Discussion of the Background

The detachable fixing of the electric block to the carrier base must be both reliable and durable. It is known, for example according to DE-24 46 921, that the electric block can be fitted with two elastic lugs which snap into the lateral notches of the base, but there is no guided Introduction of the block and the fixture thus obtained is insufficiently resistant. It is also known that the contact block may be fixed to the base by means of a single screw. Here, the fixture is resistant, but in certain cases it is desirable to carry out the operation more quickly and to improve the original position of the block under the base.

SUMMARY OF THE INVENTION

The invention aims to improve the installation and maintaining of a snap-in electric block under a base of a control or signaling device of the type described above.

According to the invention, the electric block includes, on its fixing face situated towards the carrier base, two rigid heels, namely, on one side a ratchet heel cooperating with a ratchet stop, disposed loosely in the base and elastically biased, and on the other side a positioning and maintaining heel inserted in a recess of complementary form housed in the base.

The introduction of the rigid positioning heel in the recess allows the operator to pre-position, with retaining effect, one side of the electric block on the base before proceeding to the ratcheting of the heel situated on the other side, while at the same time improving the rigidity and toughness of the assembly.

The electric blocks are advantageously stackable and, for this purpose, present on their connecting face which is situated opposite the base, a ratchet lug and a recess which are similar to the stop and the recess of the base for receiving the corresponding heels of a stacked block.

BRIEF DESCRIPTION OF THE DRAWINGS

A clearer understanding of the invention may be obtained from the following description, and its accompanying figures, of a preferential embodiment.

FIG. 1 is a front view of a push-button according to the invention.

FIG. 2 is a front and sectional view, from the other side, of a part of the push-button, constituted by the base and the contact block.

FIG. 3 shows the fixture part of the contact box in perspective.

FIG. 4 is a view taken from below of the base represented in FIG. 2.

FIG. 5 illustrates the structure of the metallic base.

DESCRIPTION OF THE PREFERRED EMBODIMENT

The electric control or signaling device illustrated in the figures is a push-button comprising a body 10 fitted with a head 11 and a tubular part 12 of axis X1 and of a diameter less than the width of the head. If required, this head is placed with a joint and/or a label, neither of which is represented, on an outer face 13a of a thin support wall 13, for example metallic, belonging to an enclosure such as a console, cupboard, etc. The wall 13 is oriented along an S-shaped plane and comprises an orifice 13b in which the tubular part of the push-button is inserted with play, this part comprising for example the movable end of the button's push mechanism.

A metallic base 20 of a general polygonal contour, preferentially rectangular, is associated with the push-button on the reverse of the wall 13, that is to say of the inner side of the said wall 13, in order to carry, in a detachable fashion, detachable electric blocks such as contact block switches, indicator light blocks or auxiliary blocks. The base is placed on the tubular part and is immovably attached to it by shaping elements which cooperate, for example through interlocking or ratcheting, so as to prevent the base from being extracted in directional axis X1. The base 20 provides a central opening 21 for the free passage of the tubular part 12 of the push-button which has an end 12a and is also anchored against the inner face 13c of the wall 13 by means of an attachment slide 22 prompted by a non-represented control screw.

The contact block 30 comprises a prismatic casing 31 made of insulating material and presenting on the base side a fixing face 32, and on the opposite side, a connecting face 33 for the access of a tool, via orifices 34a, 34b housed in this said face 33, to screws or other connecting elements 35 for wiring conductors to be introduced laterally. The conductors may be introduced into orifices 36a, 36b housed in little lateral faces 37a, 37b of the casing, which said casing presents, lastly, large lateral faces 38, 39.

The base 20 may be made of metal or plastic material; it is designed to carry several contact blocks 30 side by side, that is to say three or more. To be fixed to the base, each block 30 presents, on its fixing face 32, on one side a rigid ratchet heel 40 cooperating with a mobile metal stop 23 of the base, and on the other side a rigid positioning heel 41 which is attached in a recess 24 of complementary shape housed in the base and which is applied against a shoulder 24a of this recess in such a way as to resist the efforts communicated to the contact block by the push-button along push axis X1. The rigid positioning heel 41 protrudes in relation to the face 32 of the base side and is closer to the said base than the insertion area of the ratchet heel 40 in the stop 23. Said stop is biased by a spring 23a in a P-shaped plane perpendicular to X1, so that it moves parallel to the large sides 20a, 20b of the base, and presents an end 23b (see FIG. 2) which leaves the base 20 by a passage 23c of the bottom 20c of the said base in order to allow the de-ratcheting of the heel 40.

The heel 40 presents a slope 40a cooperating with an inclined face 23e of the stop 23 in order to facilitate insertion, and a sloping shoulder 40b cooperating with another inclined face 23f of the stop in order to secure a good hold and automatic backlash elimination.

The three stops 23 are provided near a little side of the base and the three recesses 24 near the opposite small side of the base. A movable finger 42 of the block 30 protrudes from its fixing face 32 in order to cooperate with the movable tubular part 12 of the push-button. In addition, a rigid positioning slug may be provided on the fixing face 32 of the contact block near the heel 40 in order to cooperate with a positioning hole of the base and thus contribute to the proper positioning of the lug. A flask 43 presenting openings 23c is fixed to the base by usual, non-indicated means so as to act as support to the springs 23a and to help guide the stops.

Indentations 45 which cooperate with guiding and maintaining ears 26 belonging to the base are provided at the foot of the big lateral faces 38, 39 of the contact block. Said ears protrude downwards and possess an inclined edge whose outer face prolongs the big lateral walls of the base. In this way satisfactory guiding of the lateral face of the contact block is obtained when the said block is approached slantwise and its rigid heel 41 is inserted in the recess 24 of the base, so as to obtain ultimately an alignment of a big lateral face 38 or 39 of an external block with the corresponding big wall of the base.

On its connecting side 33, the block 30 presents on one side a ratchet lug 50 conformed to receive the ratchet heel 40 of a block which is to be stacked on the block 30. On the other side, the block 30 presents an orifice 52 fitted with a recess 53 with retaining shoulder 53a similar to the recess 24 of the base 20 for receiving the rigid positioning heel of the subjacent block. The orifice 52 may be distinct from or merged with the orifice 34a.

I claim:

1. Electric control or signaling device comprising:

a body insertable in an orifice of a wall and having a movable part;

an electric block connected to the body and a carrier base connected to the block by a detachable fixing member, said base having a recess formed therein, wherein the electric block has a fixing face which faces the carrier base and comprises on said fixing face a first and second integral rigid heel, said first heel being positioned on one side thereof and cooperating with a ratchet stop movably mounted on the base so as to be movable in a plane perpendicular to the axis of said movable part of the body and which is elastically biased by a spring, said second heel being positioned on an opposite side of said electric block;

said second heel comprising a positioning and maintaining heel inserted in said recess formed in the base wherein the electric block includes in lateral faces thereof indentations which cooperate with a guiding and maintenance ear which protrudes from the carrier base.

2. Device according to claim 1, wherein the recess housed in the carrier base includes a retaining shoulder which is engageable with said second heel.

3. Device according to claim 1, wherein the ratchet wheel has a sloping shoulder and the ratchet stop has an inclined face which cooperates with the sloping shoulder of the ratchet heel.

4. Device according to claim 1, wherein the ratchet stop comprises a de-ratcheting end portion movably mounted along a bottom portion of the base.

5. The device according to claim 1, wherein said electric block includes on a connecting side thereof a ratchet lug receiving a ratchet head of a second block and includes an orifice receiving a heel of said second block.

* * * * *